Patented Dec. 27, 1938

2,141,959

UNITED STATES PATENT OFFICE 2,141,959

LEAKPROOFING PACKED JOINT IN GAS DISTRIBUTION SYSTEMS

John R. Skeen, Philadelphia, Pa., assignor to The United Gas Improvement Company, a corporation of Pennsylvania No Drawing. Application March 1, 1937, Serial No. 128,555

7 Claims. (Cl. 48—190)

Gas distribution systems include joints and other devices packed with jute or other suitable cellulosic fiber which is usually backed up with lead, cement or other material. In the distribution of moist gases the packing usually remains leakproof or tight. However, it is common experience that upon the introduction of dry gas into the system the packing develops leaks due to drying and consequent shrinking.

Ethylene glycol and diethylene glycol are useful in moistening the packing and thus reducing gas losses due to joint leakage in gas distribution systems as described and claimed in copending application Serial Number 673,618 filed May 31, 1933, by Duncan B. Williams, now Patent Number 2,094,691, issued October 5, 1937.

Ethylene glycol or diethylene glycol may be sprayed into the interior of the gas main or fogged into the gas stream within the main as a result of which the fiber packing of successive joints becomes impregnated, or the material may be flowed along the bottom of the main into contact with the packing at the bottoms of successive joints as a result of which the packing becomes impregnated by climbing of the liquid up through the packing by capillary action. Any other means for bringing the liquid into contact with the packing may be employed.

It was not known that certain derivatives of these two substances were useful for this purpose while others though possessing the desirable characteristics of low vapor pressure, moderate viscosity, relative inertness to the gas, and fiber wetting ability were not useful.

One of the essential properties of a good leakproofing liquid is its ability to swell cellulose fibers such as jute. In order to prevent joint leakage due to dehydration of the packing by dry gas, the leakproofing material must have the property of replacing the water removed from the packing and causing an equivalent volume expansion of the packing material.

This property of causing a volume expansion in dry jute equal to water is not common to all glycol derivatives since these derivatives show unique and unpredictable differences. This will be evident on comparing the action of the mono methyl ethers of these glycols—see 4 and 5 in Table 1—with the mono butyl, phenyl, ethyl and methyl amyl ethers of the corresponding glycols—see Table 2.

The data in Table 3 is given to show why such materials as the hydrocarbons comprising drip oil and such oils as spindle oil have failed to prove satisfactory materials for leakproofing the joints of gas distribution systems carrying dry gas.

TABLE 1

Liquids causing maximum swelling

| | Volume expansion of dry jute on saturation (per cent) |
|---|---|
| (1) Water | 44 |
| (2) Ethylene glycol | 44 |
| (3) Diethylene glycol | 44 |
| (4) Mono methyl ether of diethylene glycol | 44 |
| (5) Mono methyl ether of ethylene glycol | 38 |
| (6) Glycerine | 44 |

TABLE 2

Glycol derivatives which do not cause swelling

| | Per cent |
|---|---|
| (1) Mono butyl ether of diethylene glycol | 0 |
| (2) Mono phenyl ether of ethylene glycol | 0 |
| (3) Triethylene glycol | 1 |
| (4) Mono ethyl ether of triethylene glycol | 2 |
| (5) Mono methyl amyl ether of ethylene glycol | 4 |

TABLE 3

Miscellaneous materials causing incomplete swelling

| | Per cent |
|---|---|
| (1) Mixed tar bases | 0 |
| (2) Hexone | 3 |
| (3) Quinoline | 4 |
| (4) Octyl aldehyde | 8 |
| (5) Decane | 9 |
| (6) Triethyl benzene | 9 |
| (7) Octyl alcohol | 11 |
| (8) Olive oil | 13 |
| (9) Spindle oil | 14 |

It will be observed that the only commercially successful materials heretofore known, viz.: ethylene glycol and diethylene glycol, will cause an expansion of dry jute fibers of 44%—equal to that of water. Also that but three other materials have been found which will do this, namely, the monomethyl ethers of ethylene and diethylene glycol and glycerine. Glycerine, however, has a high viscosity which retards rapid absorption by the jute packing. Glycerine may be rendered more available for this purpose by reducing its viscosity such as with phenol, as described in my co-pending application, Ser. No. 128,556 filed March 1, 1937.

Water is of course too highly volatile and will not remain in the packing in the presence of dry gas.

The mono methyl ethers of ethylene glycol and diethylene glycol, respectively, are therefore the only ethers which possess this property of ethylene glycol and diethylene glycol in swelling cellulose fibers such as jute to substantially the same extent as water.

In certain other respects, moreover, these two ethers are superior to the corresponding glycols for treating the interior of gas distribution systems, since they possess a greater ability to "wet" and spread over metal surfaces than do the glycols, and will better penetrate the dust layers which properties make them highly suitable for dust laying purposes. To lay dust the walls of the gas distribution system are coated with the treating liquid in quantity sufficient to substantially moisten said walls and any dust deposits thereon. These leak-proofing and dust laying materials may be introduced either by gravity and allowed to flow thru the main to the drips, or by spraying or by fogging or otherwise as desired.

While my new treating materials penetrate to a certain extent tars and gums deposited from the gas it will be understood that if the packing material has become wholly non-absorbent in character, or has been treated to accomplish this result such as by the application and drying of tar, impregnation will obviously require the absorbent condition to be restored prior to or during the course of the treatment set forth herein as described and claimed in my above mentioned copending application.

While I have particularly described my invention it is to be understood that this is by way of illustration and that changes, omissions, additions, substitutions and/or modifications might be made within the scope of the claims without departing from the spirit of the invention which is intended to be limited only as required by the prior art.

I claim:

1. A method of treating the interior of a gas distribution system which comprises applying to the interior of said system a liquid selected from a group consisting of mono methyl ether of ethylene glycol and mono methyl ether of diethylene glycol.

2. A method of laying dust in a gas distribution system which comprises coating the walls of said system with a liquid selected from a group consisting of mono methyl ether of ethylene glycol and mono methyl ether of diethylene glycol, said coating being in quantity sufficient to substantially moisten said dust.

3. A method for reducing gas leakage at fibrous packed joints in gas distribution systems comprising impregnating the fibrous packing of said joints with a liquid which causes swelling of said packing, said liquid having as an active constituent one of a group consisting of mono methyl ether of ethylene glycol and mono methyl ether of diethylene glycol.

4. In a method for reducing gas leakage through fibrous packing such as jute in a joint of a gas conduit, the step of impregnating said fibrous packing while in place in said joint with a liquid comprising mono methyl ether of diethylene glycol to cause said packing to swell in said joint.

5. In a method for reducing gas leakage through fibrous packing such as jute in a joint of a gas conduit, the step of impregnating said fibrous packing while in place in said joint with a liquid comprising mono methyl ether of ethylene glycol to cause said packing to swell in said joint.

6. A method for rejuvenating absorbent cellulosic packing such as absorbent jute in a joint of a gas distribution system to reduce gas leakage at said joint, said packing having previously absorbed moisture followed by drying, comprising impregnating said packing with a liquid comprising one of a group consisting of mono methyl ether of ethylene glycol and mono methyl ether of diethylene glycol to effect said rejuvenation.

7. A joint in a gas distribution system comprising spaced cooperating elements, cellulosic fibrous packing between said cooperating elements positioned to form a seal, and a liquid absorbed by said packing, said liquid comprising one of a group consisting of mono methyl ether of ethylene glycol and mono methyl ether of diethylene glycol.

JOHN R. SKEEN.